Aug. 6, 1946.  D. FIRTH  2,405,122
SHAFT BEARING
Filed Aug. 25, 1944  2 Sheets-Sheet 1
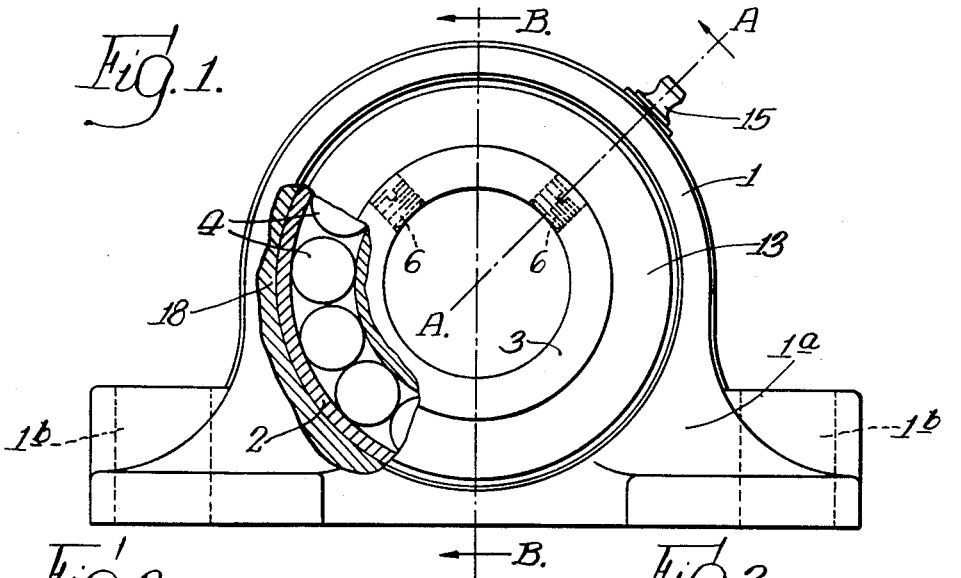
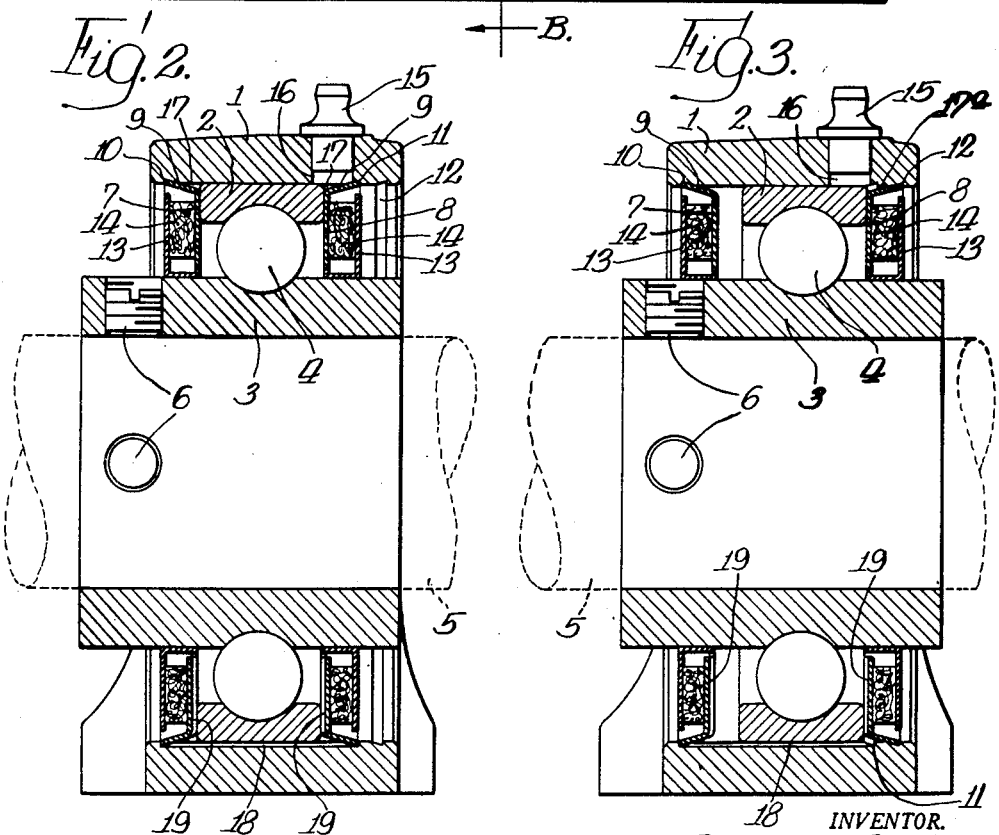
INVENTOR.
David Firth.
BY Osgood H. Dowell
Atty.

Aug. 6, 1946.                D. FIRTH                2,405,122
                          SHAFT BEARING
                      Filed Aug. 25, 1944              2 Sheets-Sheet 2
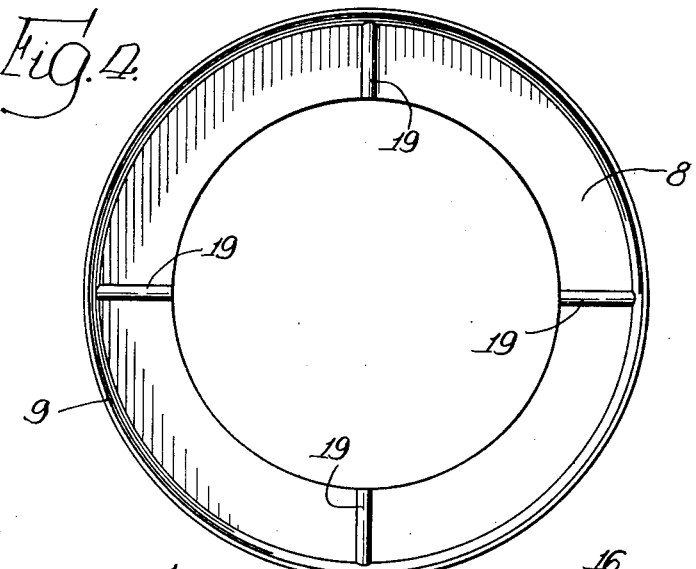
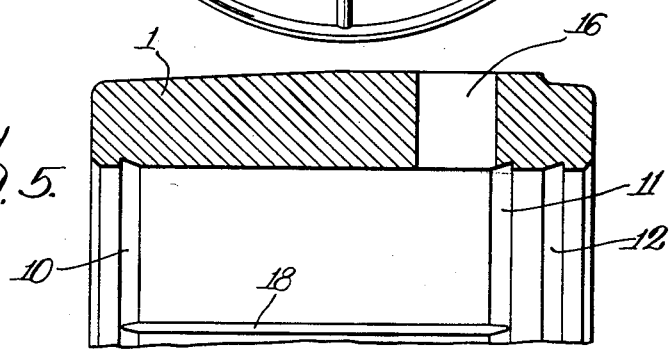
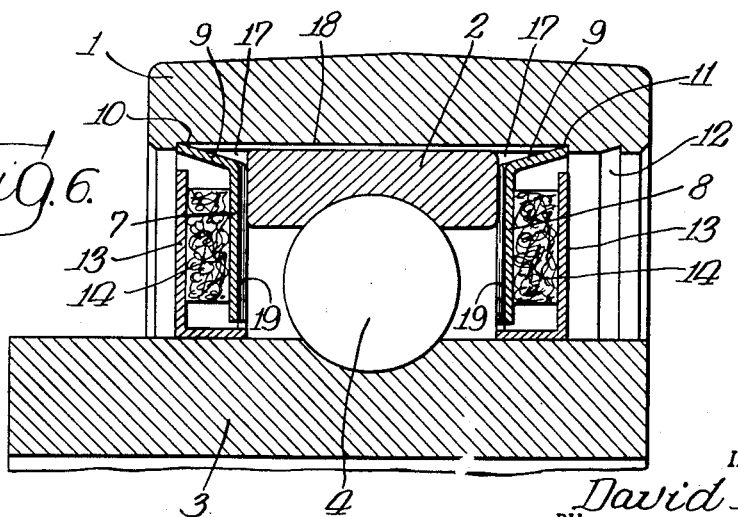
INVENTOR.
David Firth,
BY Osgood H. Dowell
    Atty.

Patented Aug. 6, 1946

2,405,122

UNITED STATES PATENT OFFICE 2,405,122

SHAFT BEARING

David Firth, South Bend, Ind., assignor to Dodge Manufacturing Corporation, Mishawaka, Ind., a corporation of Indiana Application August 25, 1944, Serial No. 551,204

9 Claims. (Cl. 308—187.1)

This invention relates to antifriction shaft bearings, more particularly of the type exemplified by an annular antifriction bearing unit and a sealed housing in which it is mounted in retained assembly therewith, the assembled bearing structure being applicable to a shaft without disassembly by slipping it over the end of and along the shaft and fastening the inner bearing ring thereto.

An object of the invention is to provide a bearing of the class indicated of relatively simple but practicable and efficient construction with respect to the housing and means for taking thrust and for sealing the bearing; having in view reduction of expense of manufacture consistently with the provision of a housing with thrust-resisting shoulders capable of withstanding thrusts due to shaft expansion and contraction.

Another object of the invention is the provision of a construction which can be easily organized either as an expanding or non-expanding bearing, and which if produced as an expanding type bearing can by a simple adjustment be converted into the non-expanding type.

Further objects more or less auxiliary or subsidiary to the foregoing will appear as the description proceeds.

In the accompanying drawings, there is shown for illustration a ball-bearing pillow block embodying the invention in one practicable form.

Fig. 1 of the drawings is an end elevation of the illustrative bearing structure, partly in cross-section.

Fig. 2 is a longitudinal section of said structure organized as a non-expanding bearing, the upper half of the section being taken on the line A—A of Fig. 1, looking in the direction of the arrows, and the lower half of the section being taken on the line B—B of Fig. 1, looking in the direction of the arrows.

Fig. 3 is a similar section of said structure organized as an expanding bearing.

Fig. 4 is an inner face view of one of the annular sheet-metal discs utilized in the illustrative structure to provide thrust-sustaining abutments, said discs being also components of sealing closures.

Fig. 5 is an enlarged longitudinal section of a part of the bearing housing, taken on the line A—A of Fig. 1.

Fig. 6 is an enlarged longitudinal section of a part of the illustrative structure organized as a non-expanding bearing, the section being taken on the line B—B of Fig. 1.

In the drawings, 1 denotes a bearing housing, shown as an interiorly cylindrical member open at both ends; said member being of generally annular form though it is shown formed integrally with a base 1ª provided with holes 1ᵇ for passage of bolts for attaching it to a machine frame or other support. The housing may if desired be truly annular or of uniform cross section and mounted in a two-piece outer housing or in a strap-type supporting and holding structure such for example as is disclosed in the Carver Patent 1,931,055 of October 17, 1933.

Mounted in said housing is an annular ball bearing unit, the outer race-ring 2 of which fits the bore of the housing. It will be understood that the outer and inner race-rings 2 and 3 of said unit are held in concentric relationship and against relative endwise displacement by the interposed balls 4 running in confronting annular races or grooves in said rings, the balls being of a sufficient number or of such number and so spaced as to be held in proper assembly with the race-rings. The unit shown typifies any suitable annular anti-friction bearing unit which may be utilized in a structure to which the present invention may be applicable.

Assuming the inner race-ring to be mounted on and attached to a shaft, end thrust imposed by shaft expansion and contraction will be transmitted by the balls to the outer race-ring and from the latter to the housing by means presently to be described. The inner race-ring 3 of the illustrative structure is designed to be mounted directly on the shaft to which the structure is to be applied, such shaft being indicated in dotted lines and designated by the numeral 5 in Figs. 2 and 3. Said inner race-ring is therefore bored to fit the shaft, preferably with such a close slip fit as to require tapping said ring with a hammer to force it on and along the shaft to desired position thereon. Said inner race-ring is shown as elongated, extending beyond the ends of the outer race-ring and also beyond one end of the housing. In its projecting end it is provided with threaded screw-holes containing short set-screws 6 in threaded engagement with said ring and adapted to be screwed therein tightly against the shaft for fastening the inner race-ring thereto. For a reason hereinafter appearing, as well as to avoid objectionable projections, the set-screws 6 are entirely within said inner race-ring.

For retaining the annular ball bearing unit in assembly with the housing, and transferring end thrust in either direction from the outer race-ring of said unit to the housing, the illustrative structure is provided with means now to be described.

Thrust-sustaining abutments between which said outer race-ring 2 is confined are provided in the housing by annular saucer-shaped sheet-metal discs 7 and 8 of greater diameter than the diameter of the housing bore, arranged with their backs toward said race-ring and with their flaring rims or flanges 9 abutting against shoulders provided by annular notches or grooves 10 and 11 (or 10 and 12) in the housing, said notches being appropriately formed to accommodate the portions of the disc rims or flanges of greater diameter than that of the housing bore.

In the preferred form shown, the sheet-metal discs 7 and 8 have conical flanges 9 of only moderate slant to the horizontal. The main flat portions of the discs and the bends therein where their flanges join said main flat portions are of less diameter than that of the housing bore, but said flanges at their free ends are of substantially greater diameter than the diameter of said bore. The annular notches in the housing to receive the disc flanges are correspondingly shaped and arranged, providing in the housing interiorily conical surfaces in which the disc flanges fit, said surfaces extending inwardly or toward the race-ring 2 from shoulders provided by the walls of the notches which are more remote from said race-ring and against which the free ends of the disc flanges abut.

As will be apparent, the sheet-metal discs 7 and 8 by virtue of their resiliency can be forced into place by pushing them inwardly from the opposite open ends of the housing. As they are pushed inwardly or toward the race-ring 2 through the cylindrical bore of the housing, their flanges are contracted, with accompanying stressing and slight distortion of their main flat portions. As soon as the free ends of their flanges pass the shoulders provided by the outer walls of the notches 10 and 12, the resilient discs will snap or spring into place with their flanges in said notches and abutting against said shoulders. The discs are thereby locked in and held by the housing against longitudinal displacement outwardly or in directions away from the race-ring. Effectual means are thus provided for sustaining end thrust in either direction.

Although neither of the discs 7 and 8 can be withdrawn or pulled outwardly without destroying or ruining it, yet either can be dislodged from the annular housing notch with which it is engaged by forcing it inwardly therefrom, unless such movement be obstructed by the race-ring 2 abutting the opposite disc. This allows providing in the housing between either end thereof and the race-ring a plurality of annular notches for successive engagement by the corresponding disc. In the illustrative structure there are provided in the housing one annular notch 10 for the disc 7 and two notches 11 and 12 for the disc 8; the notches 11 and 12 being identical and each of them arranged symmetrically relative to the notch 10. As will be apparent, the disc 8 can be engaged either with the notch 12 as in Fig. 3, or with the notch 11 as in Fig. 2, being forcibly displaceable from the position shown in Fig. 3 to that shown in Fig. 2. When engaging the notch 12, the disc 8 is spaced from the disc 7 a greater distance than the length of the race-ring 2, thus permitting limited to and fro longitudinal movement of the ball bearing unit relative to the housing to accommodate shaft expansion and contraction. When engaged with the notch 11, the disc 8 is spaced from the disc 7 just sufficiently to accommodate the race-ring 2 between them, thus preventing relative longitudinal movement between the housing and ball bearing unit. So by a simple expedient the bearing structure can be organized either as an expanding or a non-expanding bearing.

Sealing closures are provided by the discs 7 and 8, associated outer discs 13 carried by the inner race-ring, and interposed felt pads 14 or packings of other suitable material to prevent leakage of lubricant from the bearing and to prevent passage of dust and foreign particles into the bearing. The sheet-metal outer discs 13, formed with central cylindrical flanges, are tightly fitted or pressed on the inner race-ring 3, and are thereby affixed to said inner race-ring and rotate therewith.

For lubricating the bearing, grease may be introduced through an appropriate fitting or grease plug 15 plugging a grease hole 16 extending radially through the housing wall. When the illustrative structure is organized as a non-expanding bearing, as shown in Figs. 2 and 6, annular grooves are created by and between the end faces of the race-ring 2 and the outer surfaces of the disc flanges 9, which parts and the surrounding interior wall of the housing define the walls of annular grease passages 17. As shown, the grease hole 16 is so located as to lap the annular groove 11, and therefore it registers with the one of said grease passages 17 which is nearer the annular notch 12. The annular grease passages 17 are connected by cross passages provided by appropriately spaced longitudinal grooves 18 in the inner wall of the housing 1. From said annular passages 17, the grease passes into the bearing through radial passages provided by radial corrugations 19 in the discs 7 and 8, as shown more clearly in Figs. 4 and 6. For convenience of illustration, it is assumed that the longitudinal passages 18 and radial passages 19 are arranged so that some of them are in the plane B—B of Fig. 1 and hence appear in the section of Fig. 6, though it will be understood of course that the grooves 18 may be variously arranged and the discs 7 and 8 positioned indiscriminately in various angular positions, there being no necessity for registration of the passages 18 and 19 as shown in Fig. 6.

Fig. 3 shows the illustrative structure organized as a bearing of the expanding type, and shows the annular ball bearing unit in one of its extreme positions, namely, in the position in which the outer race-ring 2 abuts the disc 8. It will be noted that in movement of said unit to such position the holes in the inner race-ring containing the hidden set-screws 6 are brought within or practically within the housing, there being no obstruction to movement by outward projection of the set-screws. When the parts of the structure are in the relationship shown in Fig. 3, an annular grease passage is created at 17ª, corresponding to the right hand grease passage 17 in Fig. 2. Though the grease hole 16 should not communicate with the annular notch or groove 12, it is desirably located for direct communication with said passage 17ª, from which grease may pass into the bearing through the radial passages 19 shown in Figs. 4 and 6. In the specific construction shown, the longitudinal dimension of the flange 9 of disc 8 is greater than the distance from the shoulder which it abuts in notch 12 to the corresponding shoulder in notch 11, so that the portion of said flange adjacent to the main flat body portion of said disc is within or surrounded by or immediately adjacent to the notch 11, wherefore the grease hole 16, since it registers with the annular notch or groove 11, also registers or connects directly with the annular grease passage 17a when such passage is created by the relative positioning of parts shown in Fig. 3.

It will be apparent that grease can be forced into the bearing of the illustrative structure in any condition thereof, whether organized as an expanding or a non-expanding bearing, and in any position of the outer race-ring 2 when the structure is organized as an expanding bearing, since said race-ring can never in any position be directly under nor block the grease hole 16.

The specific construction shown for obtaining direct connection of the grease hole 16 both with the right hand passage 17 of Fig. 2 when created and with the corresponding passage 17a of Fig. 3 when created, would permit a spacing of the notches 11 and 12 somewhat further apart than as shown without altering the essential character of such specific construction or destroying the effect of obtaining such direct connections. Such effect might also be obtained in other specific ways. For example, if the notch 12 were spaced from 11 such a further distance that an exteriorly cylindrical portion of the race-ring 2 (as distinguished from the rounded corner end portion thereof) would come directly under notch 11 when said race-ring abuts disc 8 engaging notch 12, nevertheless the grease hole 16 might be located somewhat to the right from the position shown and in registration or direct connection with notch 11 and also with passage 17a when created, though not in connection with notch 12. Moreover, even if the hole 16 were not located as last suggested, grease forced therefrom into the notch or groove 11 could pass by longitudinal passages 18 to the end of the race-ring 2 adjacent the disc 7 and thence to the bearing.

Assuming the illustrative structure to be manufactured as an expanding bearing, it can be converted into a non-expanding bearing by forcing the disc 8 from notch 12 to notch 11 by a suitable annular tool passing around the associated disc 13, and forcing the latter inwardly a corresponding amount.

I claim:

1. A shaft bearing comprising a housing and an annular antifriction bearing unit mounted therein and having within the housing a resilient contractible annular element abuttable by one end of the outer race-ring of said unit, said element being of greater diameter than that of said unit and said housing having a pair of internal annular grooves in either of which said element can be seated and in a selected one of which it is seated, said element when seated in either of said grooves being held against longitudinal displacement by end thrust of said race-ring, there being in the housing thrust-sustaining means abuttable by the opposite end of said race-ring and said grooves being so located that said element when seated in the outer one of said grooves is spaced from said means a sufficient distance to permit limited longitudinal movement of the interposed race-ring relative to the housing and when seated in the inner one of said grooves said element and means hold said race-ring against such relative movement.

2. A shaft-bearing of the construction described in claim 1 wherein said annular element is a saucer-shaped sheet-metal disc arranged with its back toward said race-ring and which by virtue of its resiliency and contractibility can be forced inwardly from the outer one of said grooves and sprung into place in the inner one of said grooves.

3. A shaft-bearing comprising a housing and an annular antifriction bearing unit mounted therein, said housing having internal annular grooves and the outer race-ring of said unit being fitted in the housing between said grooves, and resilient contractible annular elements of greater diameter than that of said unit sprung into and seated in said grooves and providing thrust-sustaining abutments for said race-ring, said elements consisting of saucer-shaped sheet-metal discs having flat main portions and outwardly flaring conical flanges, said flat portions and adjacent portions of said flanges being of less diameter than the bore of the housing and the free ends of said flanges being of greater diameter than said bore, said grooves being shallow notches having relatively short conical walls and outer end walls forming thrust shoulders, said flanges being sprung into and fitting said notches and bearing at their free ends against said shoulders.

4. A shaft-bearing comprising a housing and an annular antifriction bearing unit mounted therein, said housing having internal annular grooves and the outer race-ring of said unit being fitted in the housing between said grooves, and resilient contractible annular elements of greater diameter than that of said unit sprung into and seated in said grooves and providing thrust-sustaining abutments for said race-ring, said elements consisting of saucer-shaped sheet-metal discs arranged with their backs toward said race-ring and their rims fitting said grooves and bearing at their free ends against shoulders provided by the groove walls remote from said race-ring, there being created between said race-ring and the rim of at least one of said discs when said race-ring abuts the latter an annular grease passage, said one of said discs being radially corrugated thereby providing radial grease passages communicating with said annular grease passage, and means for introducing grease into said annular passage.

5. A shaft-bearing comprising a housing and an annular antifriction bearing unit mounted therein and having within the housing an annular saucer-shaped sheet-metal disc arranged with its back toward the outer race-ring of said unit, said disc having a flaring rim of greater diameter at its free end than the diameter of said unit and said housing having a pair of internal annular notches in either of which the free end of said rim can be fitted and in a selected one of which it is fitted, there being in the housing thrust-sustaining means between which and said disc the outer race-ring of said unit is retained, said disc when held in the outer one of said notches being spaced from said means a sufficient distance to allow limited longitudinal movement of said race-ring relative to the housing, and said means and disc when held in the inner one of said notches holding the interposed race-ring against said movement.

6. A shaft-bearing of the construction described in claim 5 wherein the proportions are such that when the race-ring abuts said disc in either of the two positions thereof an annular grease passage is created between said race-ring and rim of said disc, there being in the housing a grease inlet hole positioned for direct connection with either such passage when created, and said disc being radially corrugated and thereby providing radial grease passages communicating with said annular grease passages.

7. A shaft-bearing of expanding type comprising a housing and an annular antifriction bearing unit mounted therein and having withing the housing an annular saucer-shaped sheet-metal disc arranged with its back toward the outer race-ring of said unit, said disc being of greater diameter than that of said unit and said housing having an internal annular notch or groove in which the outer edge portion of the disc is fitted, the disc being held against longitudinal displacement outwardly and providing a thrust-sustaining abutment for one end of the housing, there being a thrust-sustaining abutment for the opposite end of said race-ring, the distance between said abutments being greater than the length of said race-ring, there being created when said race-ring abuts said disc an annular grease passage between them, said disc being radially corrugated and thereby providing radial grease passages communicating with said annular passages, and the housing having a grease inlet hole located in direct communication with said annular passages, the proportions being such that said hole cannot be covered or blocked by said race-ring in any position thereof.

8. A shaft-bearing of non-expanding type comprising a housing and an annular antifriction bearing unit mounted therein and having within the housing an annular saucer-shaped sheet-metal disc arranged with its back toward the outer race-ring of said unit, said disc being of greater diameter than that of said unit and said housing having an internal annular notch or groove in which the outer edge portion of the disc is fitted, the disc being held against longitudinal displacement outwardly and providing a thrust-sustaining abutment in contact with one end of said race-ring, a thrust-sustaining abutment in contact with the opposite end of said race-ring, there being an annular grease passage between said race-ring and rim of said disc and communicating radial grease passages between said race-ring and disc, and means for introducing grease into said annular passage.

9. A shaft bearing comprising a housing and an annular antifriction bearing unit mounted therein and means for sealing and retaining said unit in the housing comprising annular sheet-metal inner discs having outwardly extending conical flanges which at their free ends are of greater diameter than that of said unit and seated in annular grooves in the housing and held against longitudinal displacement outwardly, said discs so held providing thrust-sustaining abutments for the outer race-ring of said unit, centrally flanged outer discs fitted on and held by the inner race-ring of said unit, and packings between said inner and outer discs, the central flanges of said outer discs extending within the center openings of said inner discs and the flanges of the latter extending around said outer discs.

DAVID FIRTH.